July 26, 1927.
E. B. JACOBSON
1,636,743
DEVICE FOR TESTING THE INDUCTION COIL AND CONDENSER OF AN
ELECTRICAL IGNITION SYSTEM OF A MOTOR VEHICLE
Filed March 5, 1925
4 Sheets-Sheet 1
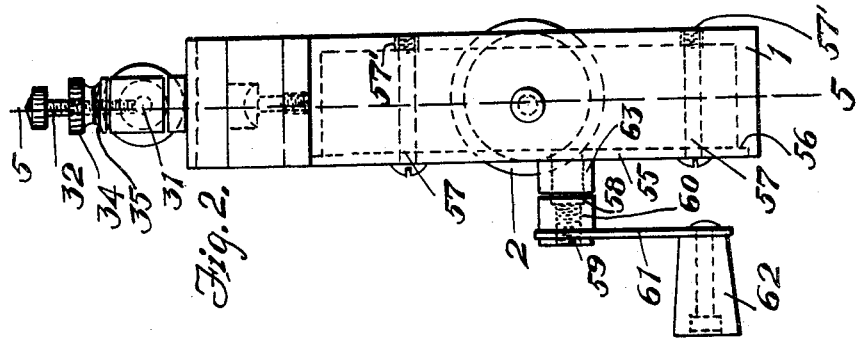
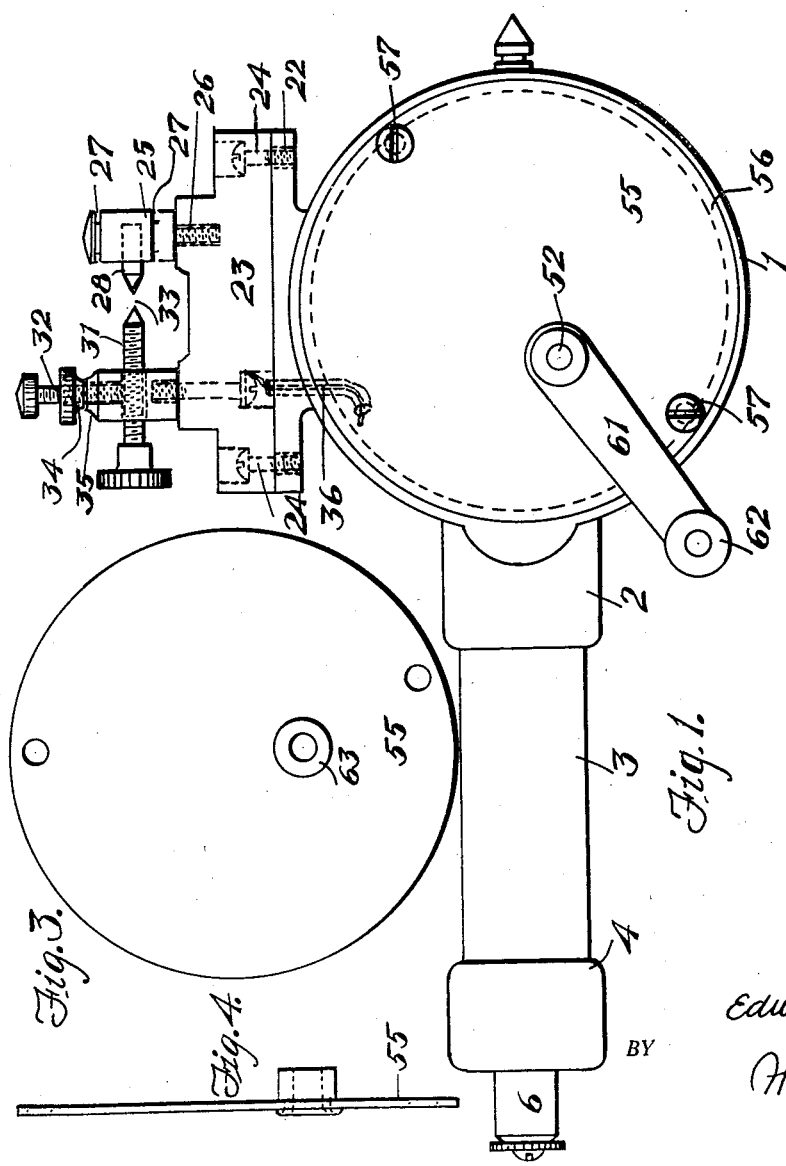
INVENTOR.
Edward B. Jacobson.
BY
Harry W. Bown.
ATTORNEY.

July 26, 1927.  
E. B. JACOBSON  
1,636,743  
DEVICE FOR TESTING THE INDUCTION COIL AND CONDENSER OF AN
ELECTRICAL IGNITION SYSTEM OF A MOTOR VEHICLE  
Filed March 5, 1925  
4 Sheets-Sheet 2
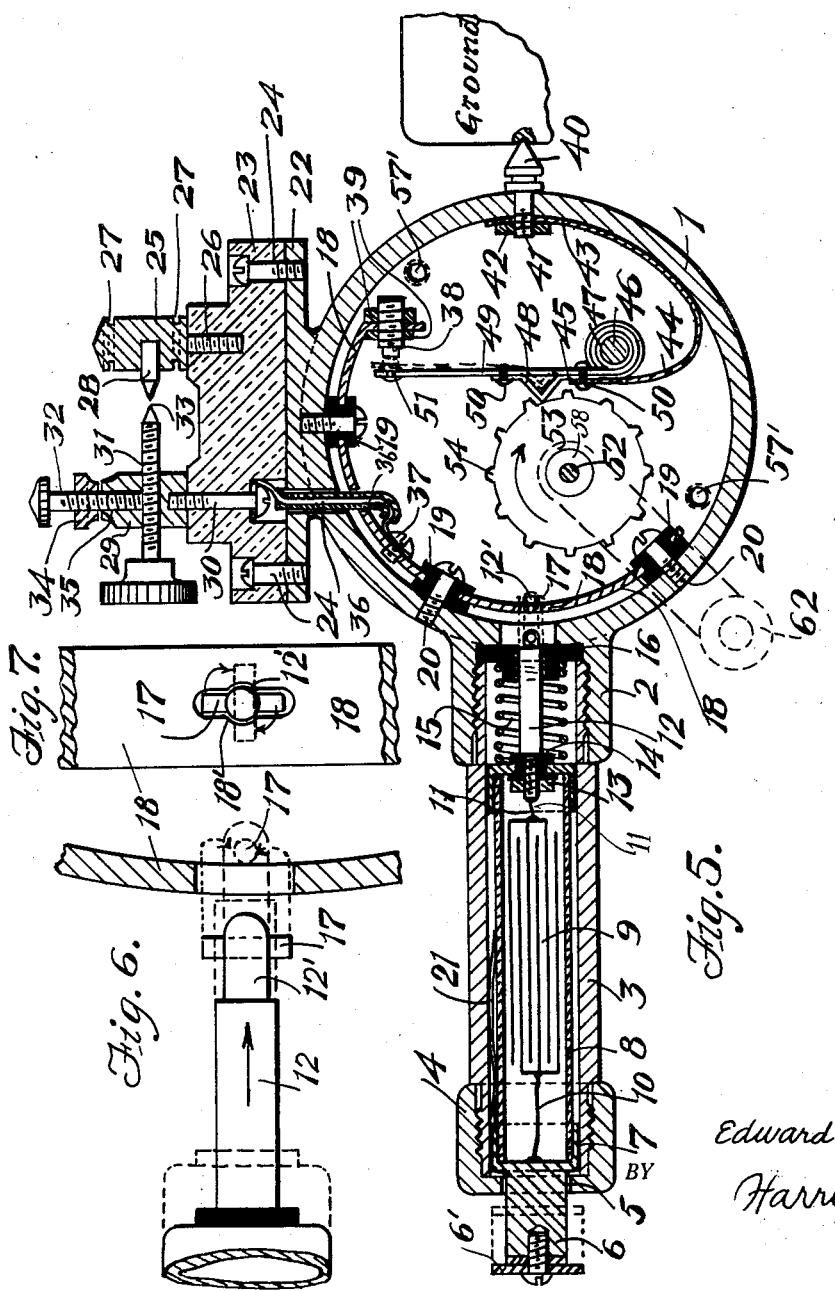
INVENTOR.  
Edward B. Jacobson.  
BY  
Harry W. Bown.  
ATTORNEY.

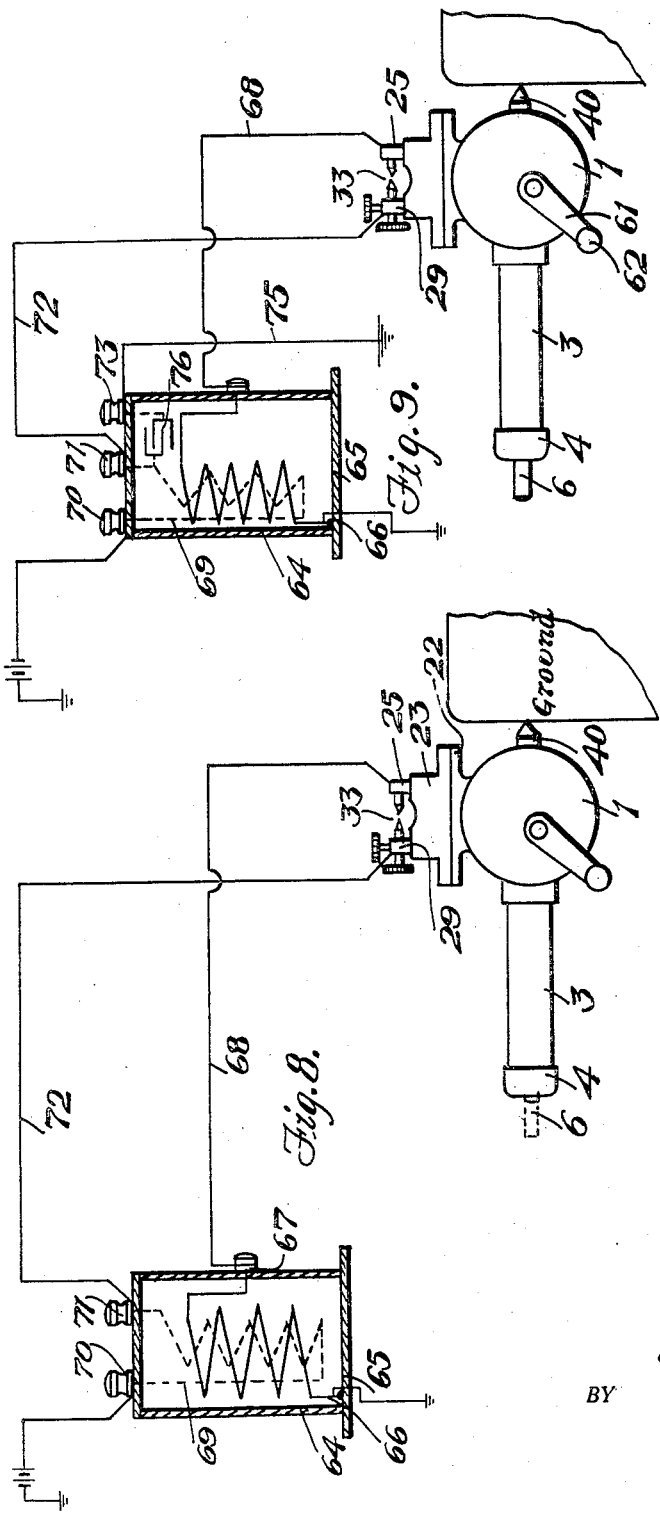

July 26, 1927. 1,636,743
E. B. JACOBSON
DEVICE FOR TESTING THE INDUCTION COIL AND CONDENSER OF AN
ELECTRICAL IGNITION SYSTEM OF A MOTOR VEHICLE
Filed March 5, 1925 4 Sheets-Sheet 4
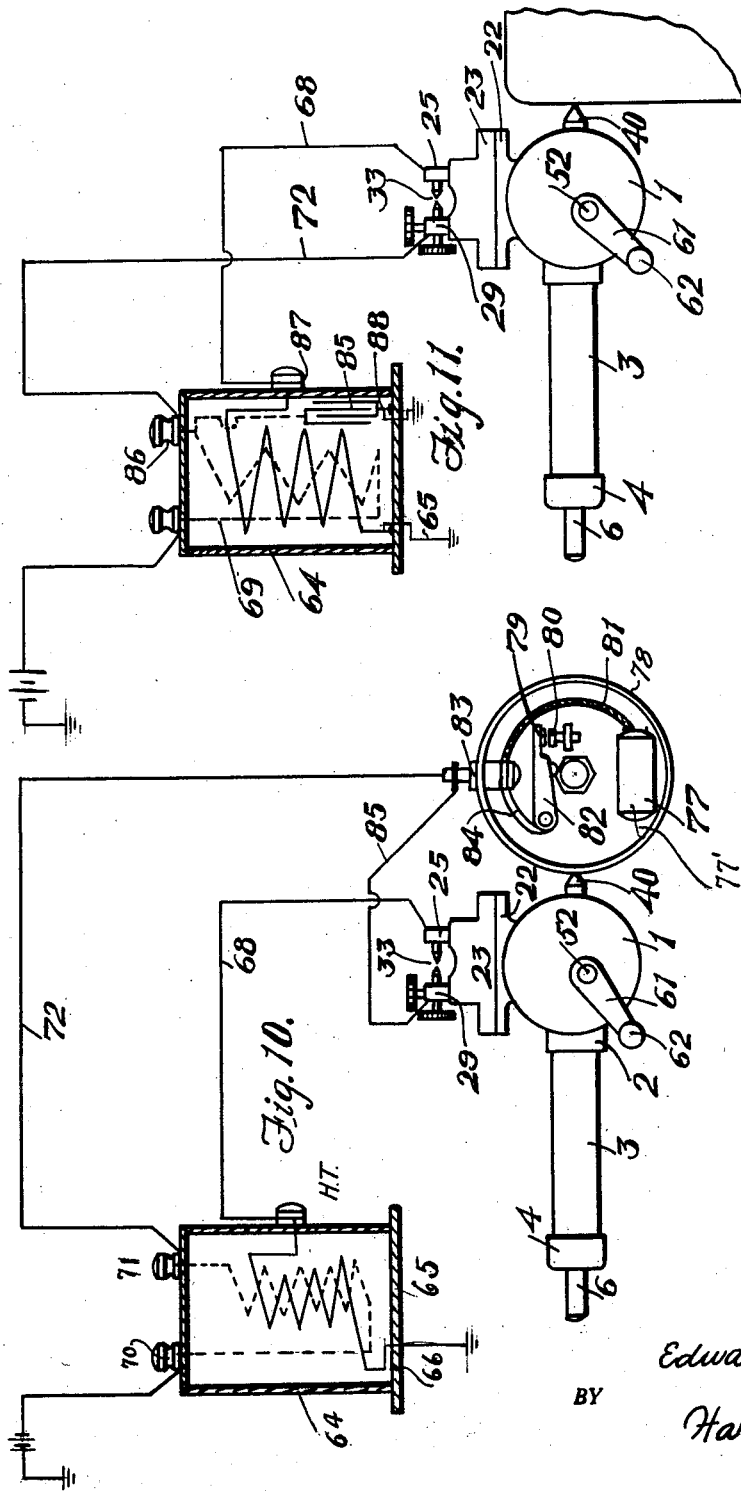
INVENTOR.
Edward B. Jacobson.
BY
Harry W. Bowen.
ATTORNEY.

Patented July 26, 1927.

1,636,743

UNITED STATES PATENT OFFICE.

EDWARD B. JACOBSON, OF PITTSFIELD, MASSACHUSETTS.

DEVICE FOR TESTING THE INDUCTION COIL AND CONDENSER OF AN ELECTRICAL IGNITION SYSTEM OF A MOTOR VEHICLE.

Application filed March 5, 1925. Serial No. 13,130.

This invention relates to improvements in devices for testing the induction coil and condenser of an electrical ignition system of a motor vehicle. That is to say, to determine whether or not both the coil and condenser are in good working condition, and, free from break downs or faults.

The device is particularly designed for portable use which can be readily carried about from place to place as a part of a road service equipment as well as for use in a garage or other places.

The device is so constructed and arranged that either the coil or the condenser may be separately tested for defects without removing either coil or condenser from the motor vehicle.

Broadly, it comprises a casing member in which is located an electric circuit, and means for electrically connecting the coil or condenser being tested, to a ground when the make and break mechanism is operated. Means is provided for readily disconnecting the condenser from the circuit when a coil is being tested. A suitable and adjustable spark gap is provided which is arranged in the ground circuit.

These and other objects will appear in the body of the specification and will be particularly pointed out in the claims, having reference to the accompanying drawings in which:

Fig. 1 is an external side elevational view showing the operating crank for making and breaking the ground circuit, and the spark gap points.

Fig. 2 is an end view of Fig. 1 looking from the right hand.

Fig. 3 is a detail view of the cover plate of the casing.

Fig. 4 is an edge view of Fig. 3.

Fig. 5 is a sectional view of the line 5—5 of Fig. 2 showing the condenser in the handle part, the make and break mechanism and the spark gap points.

Fig. 6 is a detail view of the condenser contact.

Fig. 7 is an end view of Fig. 6.

Fig. 8 is a view showing the circuits when testing a coil having no condenser.

Fig. 9 is a view of the circuits when testing a coil having a condenser which is located within the casing of the coil.

Fig. 10 is a view of the circuits when testing a condenser which is located in the breaker box and adjacent the breaker contacts of the primary circuit, and Fig. 11 is a view of the circuit when testing a coil with a condenser located in the casing of an induction coil.

Referring to the drawings in detail:

1 designates as a whole, the metallic casing which is formed with the internally threaded boss 2 to receive the threaded inner end of the handle part 3. Threaded onto the outer end of the handle is a cap 4 having an opening 5 to receive the short slidable push rod 6, which rod is secured to the fibre tubular member 8. In this tubular member is located an electrical condenser 9. One terminal of the condenser being connected by the wire 10 to the metallic member 7, the other terminal being connected by the wire 11 to the metallic rod 12 which is attached to the inner end of the fibrous tubular member 8 by means of the nut 13. This rod is insulated from the tubular member 8 by the bushing 14. 15 is a coiled expansion spring located between the inner end of the tubular member 8 and the washer 16 of insulating material, whereby the tubular member 8 is normally retained in an outward position, as shown. The metallic rod 12 slides through an opening in the insulating washer 16 when the rod 6 is pressed inward. Secured to a reduced part 12′, see Fig. 6, of the rod 12 is a pin 17. The purpose of this pin is to make or form an electrical contact with the metallic circular plate 18 which is secured to and is insulated from the metallic casing 1 by means of the insulating bushing or washers 19 and screws 20. By a slight turn of the rod 12 the pin 17 is locked in contact with the plate 18. 21 designates a leaf spring which is electrically connected to the metallic member 7 at one end and normally engages the inner surface of the metallic handle 3, as shown. 22 designates a platform portion which is integral with the metallic casing 1. Secured to this platform is a block of insulating material 23 by means of the screws 24. Attached to the block 23 is a binding post 25 by means of the threaded stem 26. This post is formed with the annular grooves 27 to receive electrical terminal connections of a wire, and secured in the post 25 is a spark gap terminal 28. Also secured to the block 23 is another binding post 29 by means of the screw 30. Passing through the binding post 29 is a threaded spark gap terminal 31. 32 is a threaded set screw designed to retain the terminal 31 in a fixed position for the purpose of accurately spacing the spark gap 33. 34 and 35 are set nuts threaded onto the set screw 32, whereby this screw may be firmly held against the threaded spark gap terminal 31. Secured to the screw 30 by clamping the end under the head thereof, is a wire 36. Its other end is electrically connected to the metallic circular plate 18 by means of the screw 37, whereby electrical connection is made from the spark gap to this plate. 38 is a contact terminal that is attached to the end of the plate 18 by means of the set nuts 39. 40 is a sharpened and hardened point that is attached to the casing 1 by means of the threaded end 41 and nut 42 which firmly connects the end 43 of the spring 44 to the casing and grounding point 40. Attached to this spring is a plate 45, which plate is rotatably mounted on the pin 46. 47 being a bushing or sleeve around which the plate 45 is coiled. The plate 45 is formed with a V-shaped elevation or part 48 and attached to the plate 45 is another plate 49 by means of the rivets 50. The outer end of this plate carries a contact terminal 51 which engages the contact terminal 38. Secured to the bottom of the casing is a post 52. Rotatably mounted on this post is a wheel 53 that is formed with the spaced projections 54. 55 is a cover plate for closing the open side of the casing 1 which rests upon the annular ledge part 56 of the casing (see Figs. 1 and 2). It is secured to the casing by means of the threaded screws 57 which enter threaded openings 57' in the bottom. The wheel 53 is provided with a shaft 58 having a threaded outer end portion 59, see Fig. 2, to which is attached the hub part 60 on the end of the crank arm 61 and the knob 62. The shaft 60 passes through a bearing part 63 of the cover plate 55. It will be seen that when the handle 62 is rotated that the toothed projections 54 of the wheel 53 will engage the elevated part 48 and close the contacts 38 and 51 thus forming a connection from the spark gap to the ground terminal point 40.

Referring to Fig. 8 which illustrates the circuit connections when using the testing device for determining whether or not an ignition coil is in good working condition. In this test there is no condenser used with the coil. 64 designates the coil as a whole. 65 is understood to be the ground connection for the end 66 of the secondary winding, the other terminal of this winding being connected to the high tension binding post 67. 68 is a wire leading from the post 67 to the metallic post 25 of the spark gap 33. The primary winding of the coil is indicated at 69. The ends of which are attached to the usual binding posts 70 and 71. 72 is a wire leading from the low tension binding post 71 of the coil 69 to the other spark gap terminal 29.

It is to be understood that the condenser 9 shown in Fig. 5, is now connected to the metallic plate 18 by pushing inward on the rod 6 against the tension of the spring 15. The end 12' of the rod 12 and the pin 17 will pass through the key-shaped opening 18' of the plate 18, see Figs. 5, 6, and 7. The pin 17 is now located on the inside of the plate 18. When the operator rotates the rod 6 the fibrous tubular member 8, in which the condenser is located, and the rod 12, by grasping the plate 6' will cause the pin 17 to assume the dotted line position shown in Figs. 6 and 7. The spring 15 will frictionally retain this pin firmly in contact with and against the inner surface of the metallic plate 18, thus forming an electrical connection of the condenser therewith. The terminals of the condenser, as will be seen, are now connected to or located on the opposite sides of the make and break terminals 38 and 51, similar to the arrangement in an ignition system of a motor vehicle.

When the operator rotates the crank arm 61 and the toothed wheel 53 in the direction of the arrow shown on the wheel (see Fig. 5) the contact or make and break terminals 38 and 51 are made and broken in the same manner as are the make and break mechanism of a motor vehicle. In other words the testing device takes the place of the usual make and break device and spark plug terminals on a car. If the turns and insulation of the ignition coil in the casing 64 are perfect a spark will take place between the terminals 28 and 31 in the space 33.

The circuits may be traced as follows: terminal 70 primary winding 69, terminal 71, wire 72, terminal 29, screw 30, wire 36, screw 37, plate 18, contacts 38 and 51, plate 49, spring 44 to the terminal 40. The secondary circuit is from terminal 67 of secondary winding 64, wire 68, terminal 25, spark gap 33, spark point screw 31, screw 30, wire 36 to plate 18, contacts 38 and 51 to ground 40. At 37 the currents divide and pass along plate 18 to pin 17, pin 12, wire 11 to one terminal of condenser 9. This terminal of the condenser is therefore connected to one side of the contact points 38 and 51. The other terminal condenser 9 is connected to the terminal 38, or other side of the contacts 38 and 51 by means of the wire 10, metallic cup shaped member 7, spring 21, metallic handle 3, and casing 1 to which the ground terminal 40 is connected. The circuit is therefore complete through ground from terminal 40 to the other terminal of the battery. That is to say one terminal of the condenser 9 is in effect connected to one terminal or side of the vibrator, and, the other terminal is connected to the other terminal or side of the vibrator terminals 38 and 51.

Referring now to the circuits shown in Fig. 9 in which the condenser of the ignition system of the motor vehicle is located within casing 64 in which the ignition coil is placed. In this construction there are three binding posts on the coil indicated at 70, 71, and 73. One terminal 73 of the condenser 76 is grounded by the wire 75. The condenser 9 of the testing device is not now connected to the metallic plate 18 as the pin 17 is in the full line retracted position shown in Figs. 5 and 6. The other side of the condenser 76 in the coil box 64 is connected to one side of the spark gap 33 through the wire 72, or in other words the terminals of the condenser 76 are connected on opposite sides of the make and break terminals 38 and 51 through the frame of the machine. When the toothed wheel 53 is rotated and these terminals are closed and opened a spark will take place at 33 between the points 31 and 28; if the turns and insulation of the coil are in perfect condition.

Referring now to the circuits shown in Fig. 10 for testing the condenser 77 located in the breaker box 78 adjacent the make and break points 79 and 80. One terminal of the condenser is connected by the piece of insulated wire 81 to the breaker lever 82 and to the terminal binding post 83 which is electrically connected to the spring 84. The primary wire 72 of the coil 64 is connected to the binding post 83. 85 is a wire which is connected to the binding post 29. The wire 68 from the high tension terminal is connected to the terminal 25. The other terminal of the condenser 77 is understood to be grounded on the breaker box as indicated at 77'. The condenser 9 is understood to be disconnected from the metallic plate 18, but is grounded by the flat spring 21 on the inner surface of the metallic tubular member 3 which is electrically connected to the hardened sharp point 40. The test is performed with the breaker contacts 79 and 80 open. If the condenser 77 is in perfect condition a spark will occur at 33 when the toothed wheel 53 is rotated.

Referring to the circuits shown in Fig. 11 for testing an induction coil having a condenser 85 located in the casing 64' of the coil. One terminal 86 of the primary winding 69 is connected by the wire 72 to the terminal 29. The wire 68 from the high tension terminal 87 is connected to the terminal 25 of the spark gap 33. One terminal of the condenser 85 is connected to the terminal 86 and its other 88 to the ground 65. The condenser 9 in the tubular member 8 is now understood to be disconnected, as shown in Fig. 5. When the operator rotates the toothed wheel 53 causing the terminals 51 and 38 to close and open the primary winding will induce a current in the secondary winding causing a spark to appear at the gap 33 if the turns and insulation of the coil are in proper working condition. The terminals of the condenser 85 are in effect connected across the terminals of the make and break contacts 51 and 38.

What I claim is:

1. A portable device for testing an induction coil comprising, in combination, a metallic casing member, make and break terminals mounted therein, manually operated means for closing and opening the terminals, including a rotatable toothed wheel in the casing, a metallic plate secured to the metallic casing member and to which one of the terminals is secured, the plate being insulated from the casing, spark points secured to the casing, one of the points being electrically connected to said plate and the other being insulated from the casing and a terminal attached to the casing for grounding said casing, the other terminal being mounted on a part that is operated by the toothed wheel.

2. A portable device for testing the working condition of an induction coil comprising a casing, a handle part attached to the casing, an electrical condenser slidably mounted in the handle part, a part attached to the casing and insulated therefrom, means when the condenser is moved in the handle for electrically connecting one terminal of the condenser to said part and means for electrically connecting the other terminal of the condenser to the casing.

3. A portable device for testing the working condition of an induction coil comprising a casing, a handle part attached to the casing, an electrical condenser slidably mounted in the handle part, a part attached to the casing and insulated therefrom, means when the condenser is moved in the handle for electrically connecting one terminal of the condenser to said part means for electrically connecting the other terminal of the condenser to the casing, and means for automatically returning the slidable condenser to its normal inoperative position when disconnected from said part, said means including a spring in the handle and a slot and pin connection between the condenser and said part.

4. An electrical portable device for testing purposes as described comprising in combination, a metallic casing open at one side, a metallic plate for closing the open side of the casing, a toothed wheel rotatably mounted within the casing and supported on the plate and the casing respectively, a make and break device located in the casing and operated by the teeth of the wheel, a plate within the casing, one of the make and break contacts being attached to the plate and the other contact on a movable part which is operated by the teeth of said wheel, a sharpened metallic part attached to the casing and the movable plate for grounding purposes, spark gap points electrically connected to the metallic plate, one of the spark gap points being secured to the metallic casing and the other being insulated from the casing.

5. An electrical portable device for testing purposes as described comprising, in combination, a metallic casing open at one side, a metallic plate for closing the open side, a manually operated toothed wheel rotatably mounted in bearings in the plate and the casing, a make and break device operated by said wheel, a plate within the casing, one of the make and break contacts being attached to the plate and the other contact on a movable part operated by the said wheel, and a sharpened part attached to the metallic casing and plate for grounding purposes, said plate being electrically connected to spark gap points which are secured to the casing and one being insulated from the casing, a handle part attached to the casing, an electrical condenser rotatably mounted in the handle, and means for temporarily connecting one terminal of the condenser to said plate when it is rotated and moved into contact with the plate and means for retaining the contact means on the plate.

6. A portable device for determining the working condition of an induction coil for ignition purposes and a condenser which is electrically connected to the terminals of the coil, and comprising a casing member, a hollow handle part therefor, a grounding terminal attached to the casing, a movable contact terminal electrically connected to the grounding terminal, a plate located in and attached to and insulated from the casing, a contact on the plate which is engaged by the movable contact, a manually operated toothed wheel rotatably mounted in the casing member for operating the movable contact, a spark gap terminal electrically connected to said plate, a second spark gap terminal insulated from the casing, a condenser mounted in the handle part of casing, and means in the handle part for connecting and disconnecting the condenser to the plate.

7. In combination, with an enclosing casing, a plate attached to and insulated therefrom and formed with an opening, a tubular member secured to the casing, a closure cap for said member and formed with an opening in its end, a second tubular member, located within the first tubular member and having a stem portion which passes through the opening in the closure cap, an electrical condenser located within the said second tubular member, a rod attached to this second tubular member, a pin on the rod for passing through the opening in the plate and designed to be retained on the inside of the plate and extend across the opening when the rod and condenser are turned about their axis, and a spring interposed between the casing and the end of the second tubular member for retaining the pin in engagement with the plate, electrical means for connecting the terminals of the condenser to the rod, and second tubular member, a part on said stem for rotating and sliding the second tubular member for connecting and disconnecting the pin from the plate.

8. An electrical portable testing device for the purpose described, comprising in combination with a metallic enclosing casing, of a block of insulation secured to the said casing, spark gap terminals secured to the block, a plate located within the metallic casing and insulated therefrom, an electrical connection between one of the spark gap terminals and the plate, a contact terminal on the plate, a movable member, a contact terminal on the movable member which engages the said terminal on the plate when this member is operated, a manually operated rotatable toothed wheel for operating the movable member and the contact thereon, a sharpened metallic piece attached to the metallic casing and electrically connected to the movable member for grounding this movable member and the casing, means for operating the said wheel, a handle attached to the casing, an electrical condenser movable in the handle, and means including a pin and a terminal of the condenser for electrically connecting and disconnecting the condenser to the said plate and casing.

9. An electrical portable testing device for the purpose described, comprising in combination with an enclosing metallic casing, of a block of insulation secured to the casing, spark gap terminals secured to the block, a plate located within the casing and insulated therefrom, an electrical connection between one of the spark gap terminals and the plate, a contact terminal on the plate, a movable member, a contact terminal on the movable member, which engages the said terminal on the plate when this member is operated, a rotatable toothed wheel for operating the movable member and the contact thereon, a sharpened metallic piece attached to the metallic casing and electrically connected to the movable member for grounding this movable member, means for manually operating the said wheel, a handle attached to the said casing, an electrical condenser slidably mounted in the handle, and means for electrically connecting and disconnecting the condenser to the said plate and casing, the construction and arrangement being such that the said condenser may be rotated and moved bodily in the handle when connection is made with the plate, and a spring for normally retaining the condenser in inoperative position.

10. A portable device for the purpose described comprising in combination with a metallic casing, a handle part attached to the casing, a part attached to the casing for grounding the same, a make and break device in the casing, means for operating said device, spark gap terminals electrically connected to the make and break device, a condenser in the handle, and means in the handle part for detachably connecting and disconnecting the condenser to the make and break device, as described.

EDWARD B. JACOBSON.